(12) United States Patent
Endo et al.

(10) Patent No.: US 7,145,695 B2
(45) Date of Patent: Dec. 5, 2006

(54) PICKED-UP IMAGE MANAGING DEVICE CAPABLE OF MANAGING PICKED-UP IMAGES BY GROUPING THE SAME, METHOD OF DETERMINING GROUP NAME, AND COMPUTER USABLE MEDIUM STORING GROUP NAME DETERMINING PROGRAM

(75) Inventors: Yasuo Endo, Ome (JP); Kazuo Ogura, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 821 days.

(21) Appl. No.: 09/966,900

(22) Filed: Sep. 28, 2001

(65) Prior Publication Data

US 2002/0039203 A1  Apr. 4, 2002

(30) Foreign Application Priority Data

Sep. 29, 2000 (JP) ............................. 2000-300955
Sep. 3, 2001 (JP) ............................. 2001-265701

(51) Int. Cl.
*H04N 1/64* (2006.01)
(52) U.S. Cl. ...................................... 358/2.1; 358/1.16
(58) Field of Classification Search ................ 358/1.9, 358/2.1, 1.15–1.18, 468
See application file for complete search history.

(56) References Cited

U.S. PATENT DOCUMENTS 4,873,513 A * 10/1989 Soults et al. ................... 345/27

6,437,797 B1   8/2002 Ota

FOREIGN PATENT DOCUMENTS

| DE | 197 48 372 A1 | 5/1999 |
|---|---|---|
| EP | 0 959 418 A2 | 11/1999 |
| JP | 07-064169 | 3/1995 |
| JP | 08-313988 | 11/1996 |
| JP | 10-233985 A | 9/1998 |
| JP | 11-164234 A | 6/1999 |

OTHER PUBLICATIONS

Hewagamage, K. P. et al. "Augmented Album: Situation-dependent System for a Personal Digital Video/Image Collection" Multimedia and Expo, 2000. ICME 2000. 2000 IEEE International Conference on New York, NY, USA Jul. 30-Aug. 2, 2000, Piscataway, NJ, USA, IEEE, US, Jul. 30, 2000, pp. 323-326, IX010511463, ISBN: 0-7803-6536-4.

(Continued)

*Primary Examiner*—Thomas D. Lee
*Assistant Examiner*—Stephen Brinich
(74) *Attorney, Agent, or Firm*—Frishauf, Holtz, Goodman & Chick, P.C.

(57) ABSTRACT

A picked-up image managing device comprises a picked-up image memory which stores items of picked-up image data and items of image picking-up position data associated with the items of picked-up image data, a grouping circuit which classifies the items of picked-up image data stored in the picked-up image memory into a group, and a group name determining circuit which determines a group name of the group based on the items of image picking-up position data associated with the items of picked-up image data of the group.

23 Claims, 15 Drawing Sheets

OTHER PUBLICATIONS

Yang, Jie et al. "Smart Sight: A Tourist Assistant System" Wearable Computers, 1999. Digest of Papers. The Third International Symposium on San Francisco, CA, USA Oct. 18-19, 1999, Los Alamitos, CA, USA, IEEE Computer. Soc., US, Oct. 18 AND 19, 1999, pp. 73-78, XP010360088, ISBN: 0-7695-0428-0 p. 76, col. 2, Line 13, p. 76, col. 2, line 40.

* cited by examiner

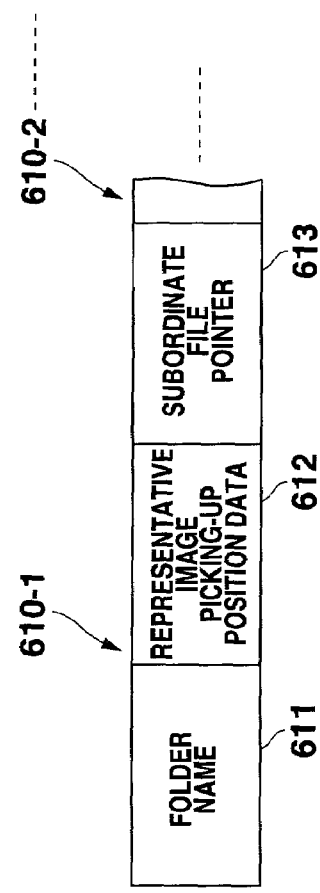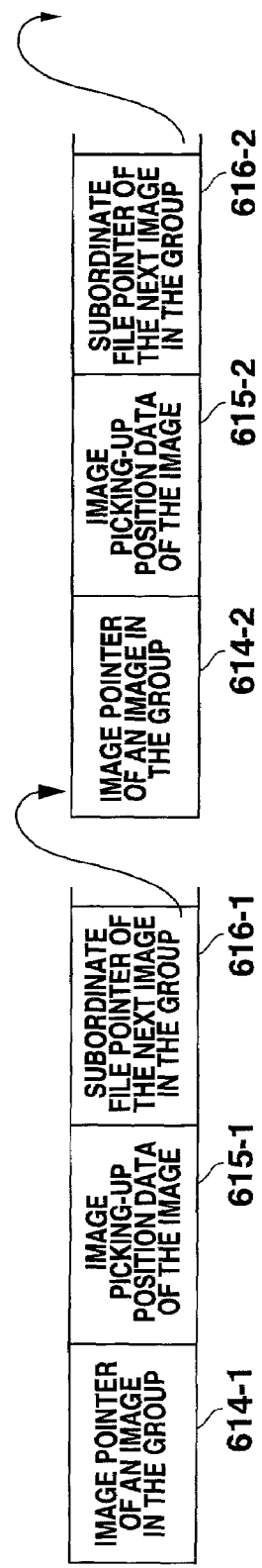
FIG.3A
FIG.3B

FIG.7

| IMAGE PICKING-UP ORDER | IMAGE POINTER | LATITUDE | LONGITUDE | DISTANCE FROM PREVIOUS SITE | GROUP |
|---|---|---|---|---|---|
| 1 | PAGE 1 | N35°36'09 | E140°07'38 | - | 1 |
| 2 | PAGE 2 | N35°36'19 | E140°06'33 | 1.6 | 1 |
| 3 | PAGE 3 | N35°36'30 | E140°06'46 | 0.4 | 1 |
| 4 | PAGE 4 | N35°55'00 | E139°29'01 | 66.0 | 2 |
| 5 | PAGE 5 | N35°54'24 | E139°28'20 | 1.5 | 2 |
| 6 | PAGE 6 | N35°54'20 | E139°28'40 | 0.5 | 2 |
| 7 | PAGE 7 | N35°25'31 | E139°21'51 | 56.0 | 3 |
| 8 | PAGE 8 | N35°25'44 | E139°21'43 | 0.5 | 3 |
| 9 | PAGE 9 | N35°25'10 | E139°20'51 | 1.6 | 3 |

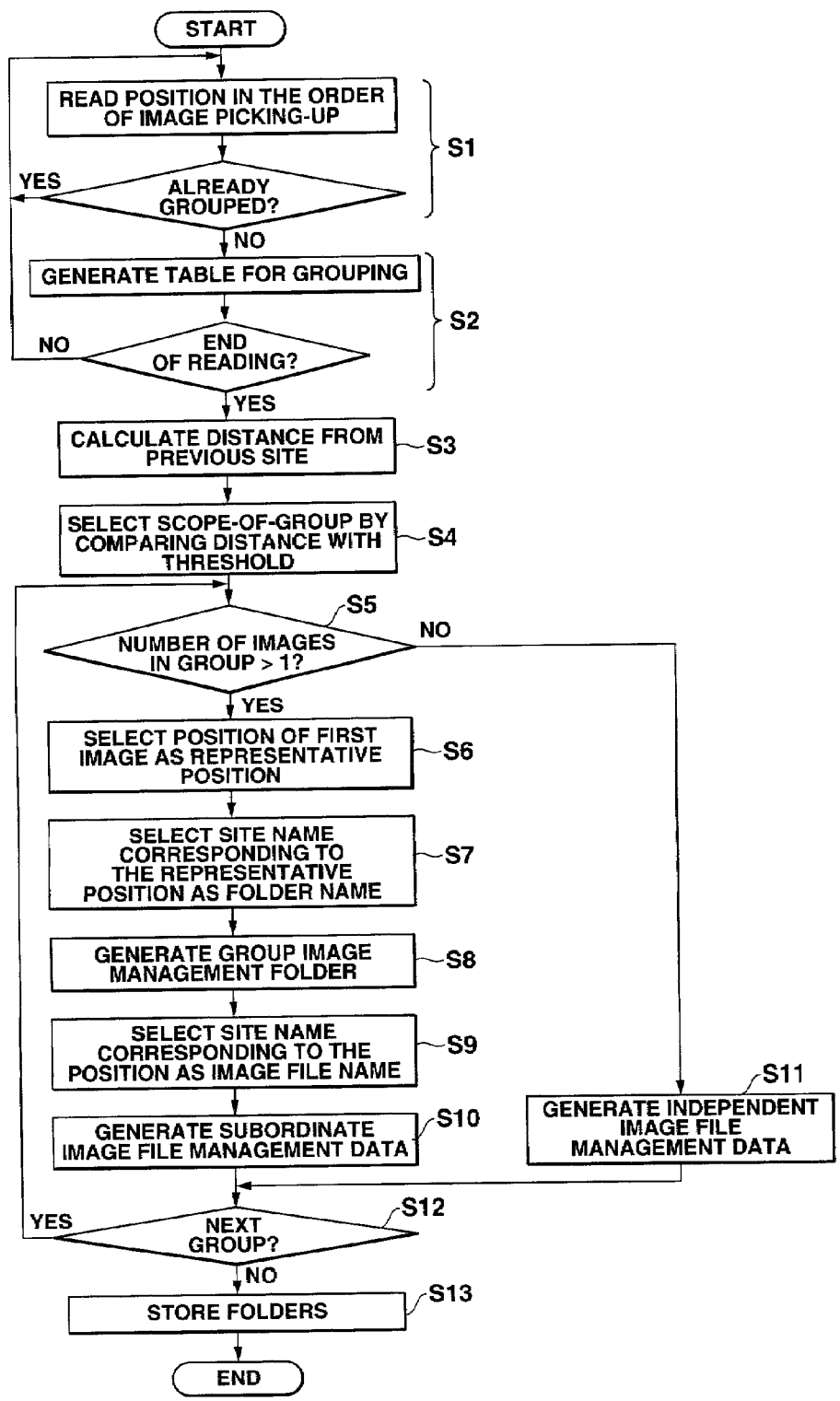

… (1) …

PICKED-UP IMAGE MANAGING DEVICE CAPABLE OF MANAGING PICKED-UP IMAGES BY GROUPING THE SAME, METHOD OF DETERMINING GROUP NAME, AND COMPUTER USABLE MEDIUM STORING GROUP NAME DETERMINING PROGRAM

CROSS-REFERENCE TO RELATED APPLICATIONS

This application is based upon and claims the benefit of priority from the prior Japanese Patent Applications No. 2000-300955, filed Sep. 29, 2000; and No. 2001-265701, filed Sep. 3, 2001, the entire contents of both of which are incorporated herein by reference.

BACKGROUND OF THE INVENTION

1. Field of the Invention

The present invention relates to a picked-up image managing device capable of managing picked-up images by grouping the same, a method of determining group names, and computer usable medium storing group name determining program. Particularly, the present invention relates to a picked-up image managing device capable of managing picked-up images in groups based on the position where the image is picked-up, a method of determining group names, and computer usable medium storing group name determining program.

2. Description of the Related Art

In some digital cameras, picked-up image data stored in the camera's memory are managed in groups or in folders, and in such a management system, normally, the picked-up image data are grouped (classified) into the folders by the date and time when each image is picked-up.

However, when re-classifying (regrouping) the picked-up images into different folders on a basis of "the site of image picking-up", very laborious steps are necessary; for example, first, each image has to be displayed in order to see what the content is, and then new folders have to be created for the new grouping, and then each classified image has to be moved into an appropriate one of the new folders.

In particular, a task of determining folder names (group names) well fitted to respective sites of image picking-up, and typing these names one character by another are extremely complex for the user.

BRIEF SUMMARY OF THE INVENTION

An object of the present invention is to provide a picked-up image managing device, a method of determining the group names, and a computer usable medium storing a program of determining group names capable of simplifying the input of the group names.

According to one aspect of the present invention, there is provided a picked-up image managing device comprising picked-up image storing means for storing items of picked-up image data and items of image picking-up position data associated with the items of picked-up image data; grouping means for classifying the items of picked-up image data stored in the picked-up image storing means into at least one group; and group name determining means for determining a group name of the group based on at least one item of the items of image picking-up position data stored in the picked-up image storing means and associated with the items of picked-up image data of the group. Thus, it is possible to simplify an inputting operation of the group name.

According to another aspect of the present invention, there is provided a method of determining a group name of picked-up images, comprising step of classifying items of picked-up image data into at least one group; and step of determining a group name of the group based on at least one of items of image picking-up position data of the group. Thus, it is possible to simplify an inputting operation of the group name.

According to still another aspect of the present invention, there is provided a picked-up image managing device comprising a memory which stores items of picked-up image data and items of image picking-up position data associated with the items of picked-up image data; and a controller which classifies the items of picked-up image data stored in the memory into at least one group and determines a group name of the group based on at least one item of the items of image picking-up position data stored in the memory and associated with the items of picked-up image data of the group. Thus, it is possible to simplify an inputting operation of the group name.

According to still another aspect of the present invention, there is provided an article of manufacture comprising a computer usable medium having a computer readable program code for determining a group name of picked-up images embodied therein, the computer readable program code comprising a computer readable program code for causing a computer to classify items of picked-up image data into at least one group; and a computer readable program code for causing a computer to determine a group name of the group based on at least one item of the items of image picking-up position data associated with the items of picked-up image data of the group. Thus, it is possible to simplify an inputting operation of the group name.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 3A and 3B are diagrams showing an embodiment of a record structure of a file and a table stored in the flash memory;

FIG. 7 is a diagram showing an embodiment of a group identification table created in a temporary memory during a grouping process;

FIG. 8 is a flowchart showing an operation example of a grouping process and group name determining process by a digital camera 100;

DETAILED DESCRIPTION OF THE INVENTION

An embodiment of a picked-up image management apparatus and a method of determining a group name according to the present invention will now be described with reference to the accompanying drawings.

Figure 1:
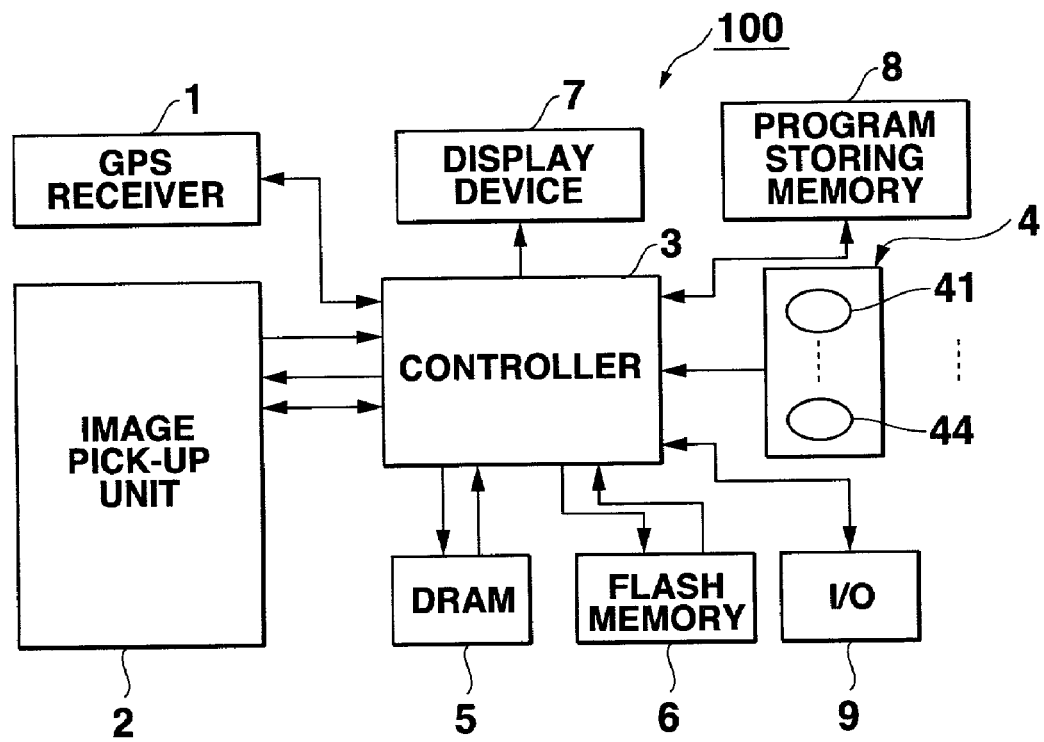
FIG. 1 is a block diagram showing a configuration of an embodiment of a picked-up image managing device according to the present invention.

FIG. 1 is a block diagram showing a configuration of an embodiment of the picked-up image managing device according to the present invention which is embodied as an electronic camera or digital camera 100. The embodiment comprises a GPS receiver (image picking-up position acquiring means) 1, an image pick-up unit (image picking-up means) 2, a controller (grouping means, group name determining means, group name display controlling means, storage controlling means, file name determining means, distance calculating means, map display controlling means, and symbol display controlling means) 3, a user-operating portion (picked-up image selecting means, scope specifying means, and symbol selecting means) 4, a DRAM (temporary memory) 5, a flash memory (a memory unit, picked-up image storing means, name storing means, and map storing means) 6, a display device (displaying means) 7, and a program storing memory (grouping means, group name determining means, group name display controlling means, storage controlling means, file name determining means, distance calculating means, map display controlling means, and symbol display controlling means) 8.

An I/O interface 9 for sending picked-up images and related data to an external device may be provided.

The GPS receiver 1 performs position measuring (positioning) including position calculation of the digital camera 100 based on data received from GPS satellites. Resulting position data from the GPS receiver 1 is sent to the controller 3 which controls the entire digital camera 100.

The image picking-up position acquiring means in the digital camera 100 is not limited to the GPS receiver 1. For example, without providing the GPS receiver 1, position information may be acquired through a position information service as part of portable telephone service (for example by a Personal Handy-phone System).

The image pick-up unit 2 captures an object image through an image pick-up lens, a CCD and so on, converts the image into digital data, obtains from the digital data signal components such as digital luminance, color difference multiplex signal (Y, Cb, and Cr data), (hereinafter called image data), and forwards the image data to the DRAM 5.

The controller 3 is a microprocessor system provided by a CPU and peripheral circuits such as a RAM and a timer. The CPU 3 is connected to each of the above circuit components, an unillustrated switch, and so on, via a bus line, performs an overall control of the digital camera, through a control program stored in the program storing memory 8, as well as providing control on various functions of the digital camera 100 by loading and executing various programs stored in the program storing memory 8 for different modes of operation, in response to a state signal sent from the user operating unit 4.

The controller 3 also loads a picked-up image managing program and other programs stored in the program storing memory 8, and controls a grouping (classifying) operation of the images, a display operation of image picking-up positions of the grouped images, and other functions of the digital camera 100.

When a shutter button 42 to be described later is fully depressed, the controller 3 performs an image picking-up process by the image pick-up unit 2, stores an obtained picked-up image data in the DRAM 5, and then loads the picked-up image data from the DRAM 5, performs an image data compression process such as a JPEG compression process, and stores the data in the flash memory 6. Image picking-up position data obtained from the GPS receiver 1 is associated with the picked-up image data and stored also in the flash memory 6. Further, when displaying the image, the controller 3 loads the picked-up image data (compressed data) from the flash memory 6, decompresses the data, and then displays the picked-up image on the display device 7.

The user operating unit 4 includes keys and switches such as a process mode selection switch 41, the shutter button 42, and a cursor key 44. When any of these keys and switches is operated, a status signal is sent to the controller 3. By operating the process mode selection switch 41, the user can switch between an image picking-up mode and a displaying mode, or select an image grouping mode and a group displaying mode.

The DRAM 5 is used as a temporary memory, and provides an image buffer area for temporary storage of a picked-up image or an image to be displayed, a temporary storage of a name data, and work area for compressing/decompressing the image data.

As will be described later, the flash memory 6 provides an image file area for storing the picked-up image data (compressed image data), a file area for storing the image picking-up position data which is stored in relation with the picked-up image data (FIG. 3). According to the present embodiment, the flash memory 6 is incorporated in the digital camera 100. However, the flash memory may be of a card type which is detachable from the digital camera 100.

The display device 7 includes a video memory, an encoder (not illustrated), and an LCD display screen. Under the display control provided by the controller 3, the LCD screen displays such information outputted onto the video memory as a menu for selecting a function from a list of processes, an image data, site name data of a position where the image is picked-up, and an icon which indicates an image picking-up position on a map.

The program storing memory 8 is provided by a nonvolatile memory such as an EEPROM, and stores control programs such as an OS, a communications controlling program, and a variety of mode selection programs. The program storing memory 8 can be referenced and updated via the controller 3. Further, according to the present embodiment, the program storing memory 8 also stores the picked-up image managing program (including a group name selection program) for performing a grouping (classifying) operation of images, as well as displaying and other operations of the grouped images.

Figure 2:
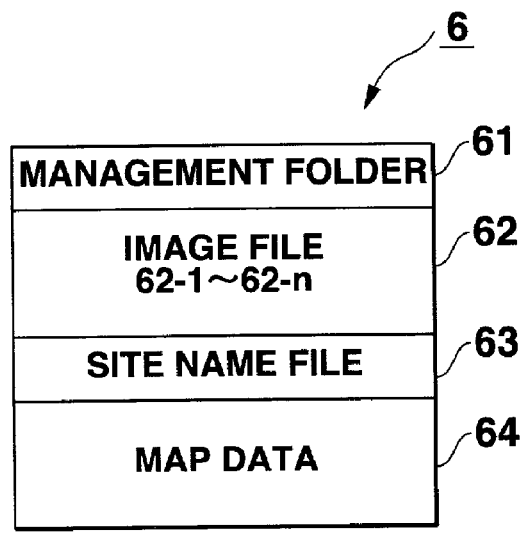
FIG. 2 is a diagram showing an embodiment of an area structure of a flash memory.

FIG. 2 is a diagram showing an embodiment of an area structure of the flash memory 6. The flash memory 6 includes a management folder area (picked-up image storing means) 61 for storing a group management folder 610 to be described later and other data; an image file area (picked-up image storing means) 62 for storing image files 62-1 through 62-n each including picked-up image data; a site name file area (name storing means) 63 for storing a site name file 630 which stores place names and facility names (name data) used in the map, in relation with their respective position data; and a map data area (map storing means) 64 for storing map data. The site name file area 63 may not be provided, since the site name file is normally included in the map data.

If an external picked-up image management device such as a personal computer is used for the image management processes such as grouping of images and determining group names as will be described later, the flash memory 6 stores the picked-up image file, and areas as shown in FIG. 2 are reserved in the storage memory of the external image-management device such as a personal computer. In the storage memory of the external image-management device, there is reserved an image picking-up-order management file area FIG. 16B.

FIGS. 3A and 3B are diagrams showing embodiments of a record structure of a file and a table stored in the flash memory 6.

As shown in FIGS. 3A and 3B, an image management folder 61 is made of a plurality of group image management folders 610 (610-1, 610-2, . . . ) each including a folder name 611 representing a group name (a character string), a representative image picking-up position data 612, and a subordinate file pointer 613 which stores an address of an image file management data of the first picked-up image in the group; and image file management data 614 through 616. According to the present embodiment, a site name (a character string) such as a place name or a facility name of the representative image picking-up position is set as the group name (folder name).

As shown in FIG. 3B, the image file management data (data for managing memory addresses of image files in the same group (stored in the same folder)) contains an image pointer 614 (614-1, 614-2, . . . ) which stores an address of an image file 620 of the image data in the group, an image picking-up position data (latitude-longitude data) 615 (615-1, 615-2, . . . ), and a subordinate file pointer 616 (616-1, 616-2, . . . ) which stores an address of an image file management data of the next image data within this group.

If there are j items of image data in a group, j items of image file management data are sequentially connected in the group image management folder 610. A j-th item of image file management data (i.e., the image data file management data for the last of the image data within the same group) has its subordinate file pointer 616 assigned with an ending mark (a unique value).

Note that according to the examples shown in FIGS. 3A and 3B, the file management data 614–616 do not store a site name at which the image is picked-up. Alternatively, however, the site name at which the image is picked-up may be stored as part of the image file management data. In such a case, the stored image picking-up-site name can be used as a file name of the image file.

According to the above description, the image management folder 61 is made of the group image management folder 610 and the image file management data 614–616. However, the image management folder may be made only of the group image management folder 610, and instead of the subordinate file pointer 613, an image pointer may be stored for each of the images belonging to the group.

The image file management data for an image file 620 which does not belong to a group image management folder 610 is made only of an image pointer 614 and an image picking-up position data 615.

The image picking-up position data 615 and the image file name may be included in each image file.

Figure 4:
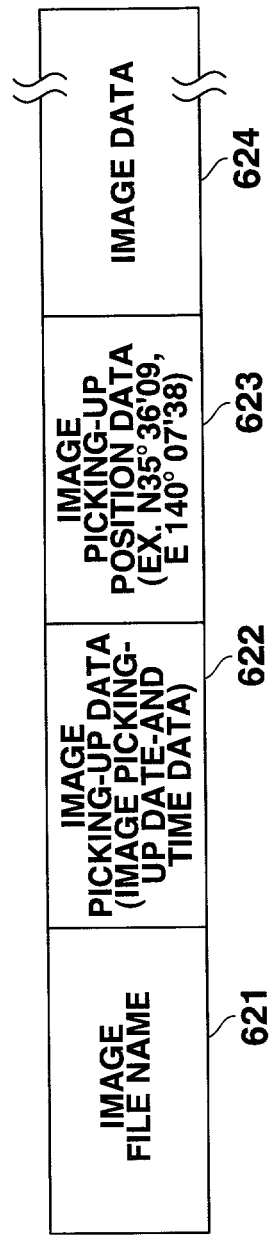
FIG. 4 is a diagram showing an example structure of an image file.

FIG. 4 is a diagram showing an example file structure of the image file 620. Each of the image files 62-1 through 62-n is made of an image file name (or an image number) 621, image picking-up data 622 including image picking-up-date-and-time, etc.; image picking-up position data 623; and image data (compressed image data) 624 for a single frame of image. The image picking-up position data 623 comprises position data (latitude and longitude) of the digital camera 100 obtained by the GPS receiver 1 at the time of image picking-up, and stored when the picked-up image data is stored.

The image picking-up date-and-time data comprises current data on date and time obtained from an unillustrated clock incorporated in the digital camera 100, and is stored when the picked-up image data is stored.

Figure 5:
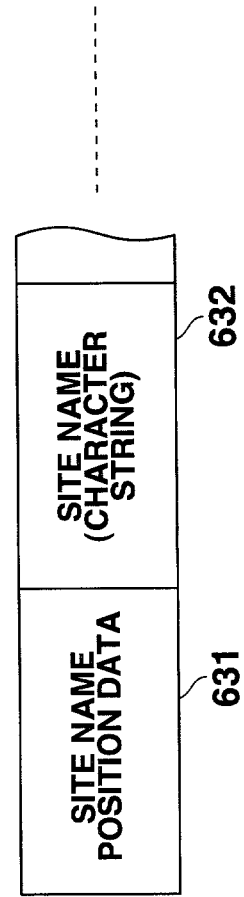
FIG. 5 is a diagram showing an embodiment of a site name file.

FIG. 5 is a diagram showing an example of the site name file 630, which is made of items of file data including site position data (latitude and longitude) 631 of various sites each given a site name (a character string) such as a place name and facility name in the map, and corresponding site name (name data) 632.

With the arrangement shown in FIG. 3A through FIG. 5, it becomes possible to make comparison between the position data of the representative image picking-up position of a group (the representative image picking-up position data 612) and the site position data 631 of the site name file 630 as will be described later, and to select the site name 632 of a site closest to the representative image picking-up position data 612, as a name of the group (folder name 611). The group name may be selected from the map data, since the map data normally includes the site name file 630.

As for the image file name 621 (image picking-up position name) of each image data in the group, it is possible to take out the image picking-up position data 615 from the image file management data or the image picking-up position data 623 from the image file 620, based on the subordinate file pointer 613 in the group image management folder 610 and on the subordinate file pointer 616 in the image file management data. By comparing the image picking-up position data thus taken, with the site position data 631 of the site name file 630, the site name 632 of a site closest to the image picking-up position can be selected as the image file name 621. The file name may be selected from the map data, since the map data normally includes the site name file 630.

Figure 6A:
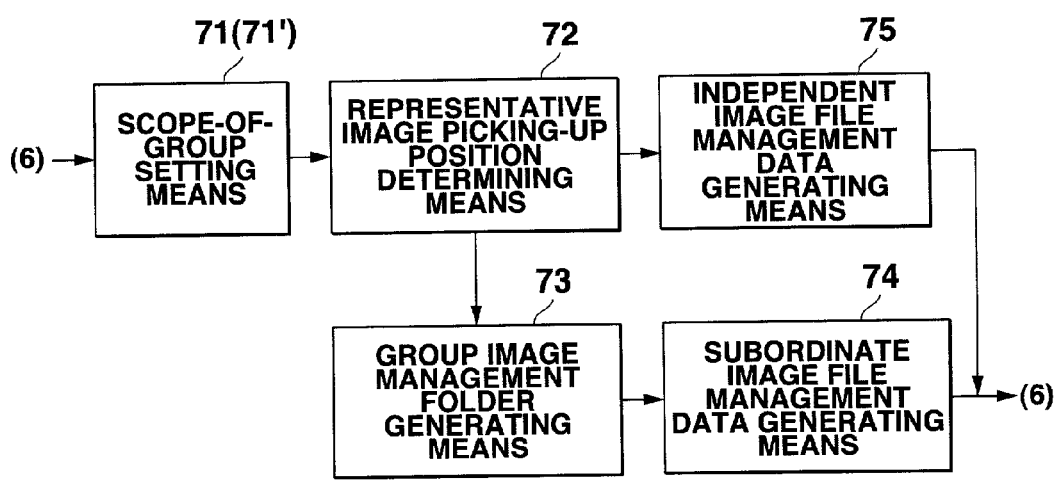
FIGS. 6A and 6B are functional block diagrams each showing a principal portion of a picked-up image managing function of a digital camera.
Figure 6B:
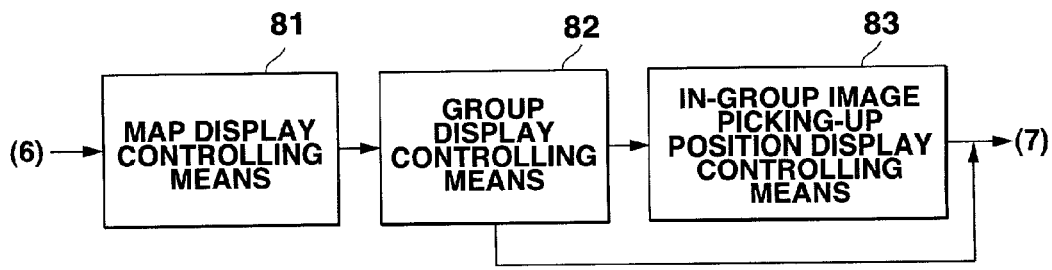

FIGS. 6A and 6B are functional block diagrams each showing a principal portion of a picked-up image managing function configuration of the digital camera 100. Specifically, FIG. 6A shows a principal portion of a captured-image classifying (grouping) function, whereas FIG. 6B shows a principal portion of a group image displaying function.

As shown in FIG. 6A, the digital camera 100 includes scope-of-group setting means 71 which sets a scope of group based on the image picking-up position data obtained from the image file 620 stored in the flash memory 6; representative image picking-up position determining means 72 which selects a representative image picking-up position for the group; group image management folder generating means 73 which obtains a group name and generates the group image management folder 610; subordinate image file management data generating means 74 which generates image file management data of the image data subordinated to the group image management folder 610; and independent image file management data generating means 75 which generates image file management data of a picked-up image taken independently.

The scope-of-group setting means 71 may include: means for displaying a selected map at a given scale; means for displaying a symbol (such as ★) at an image picking-up position on a currently displayed map, as an indication of an image picking-up position; and means for setting the scope of group within a range defined by the symbols selected and confirmed.

As shown in FIG. 6B, the digital camera 100 includes map display controlling means 81 for displaying a selected map at a given scale; group display controlling means (symbol display controlling means) 82 which displays a group name and the representative image picking-up position (symbol) of images picked-up within a current scope of display of the map; and in-group image picking-up position display controlling means (symbol display controlling means) 83 which displays on the map a group name and image picking-up positions (symbols) of a series of image data in the group if the group name or the group symbol is selected and confirmed.

The in-group image picking-up position display controlling means 83 displays the group name (image picking-up position for the group) selected and confirmed, at a predetermined place of the display screen, and zooms in the map at a smallest possible scale that allows the entire area that covers the group to be displayed on the screen.

According to the image picking-up position display performed by the group display controlling means 82 and the in-group image picking-up position display controlling means 83, each of the image picking-up positions are indicated by a symbol (such as ★). However, the kind of the symbol is not limited to ★. For example, instead of the symbol ★, a thumbnail of the picked-up image or the group name (folder name) may be displayed on the map as the symbol.

Each of the means shown in the functional block diagram in FIGS. 6A and 6B is made as a program module as part of the picked-up image management program, and is executed under the operation control of the controller 3. However, it is not limited to this.

FIG. 7 is a diagram showing an embodiment of a temporarily table for grouping which is created in the temporary memory (DRAM) 5 during a grouping process. The temporary table 90 is generated by the scope-of-group setting means 71.

The temporary table 90 includes an image pointer column 91 which provides a field for an image number (or storage address) for each of the images stored in the flash memory 6; a latitude column 92 and a longitude column 93 which provide fields for an image picking-up position (latitude and longitude) for each image; a distance column 94 which provides a field for a distance of an image picking-up position from the image picking-up position of a previous image, calculated from the latitude and longitude data; and a group column 95 which provides a field for a result (group number) given by the scope-of-group identifying operation.

FIG. 8 is a flowchart showing an operation example of the grouping process of the picked-up images and of the group name determination process performed by the digital camera 100. The image data stored in the flash memory 6 is associated with image picking-up position data.

Step S1: (Loading the Stored Images In the Order of Image Picking-up)

The controller 3 performs execution of the scope-of-group identification means 71, by first loading from the flash memory 6, an image number (or storage address) and position data (latitude and longitude) of an image file 620 in the order of image picking-up (i.e. in the order of image picking-up date and time). If a picked-up image is linked with the image pointer 614 stored in the image file management data that follows the group image management folder 610, such image data is treated as already grouped, and therefore not loaded.

Step S2: (Generating a Temporary Table for Grouping)

The loaded data, i.e. image number (or storage address), latitude and longitude are placed at respective fields of the image pointer column 91, the latitude column 92 and the longitude column 93 of the group identification table as shown in FIG. 7. The process goes back to step S1 and repeats this cycle until all of the image numbers and corresponding position data have been loaded.

Step S3: (Calculating a Distance Between an Image Picking-up Position of a Current Image and That of a Previous Image: Grouping Means)

Based on the latitude data and the longitude data stored in the temporary table 90 in step S2, the distance between an image picking-up position of the current image and that of a previous image is calculated and stored at a corresponding field of the distance column 94 of the temporary table 90.

Step S4: (Setting a Scope of Group: Grouping Means)

Each of the distance values shown in the distance column 94 of the temporary table 90 is compared with a threshold value (a predetermined distance value), sequentially. An image with a distance value greater than the threshold is classified into a new group. The threshold value is an arbitrary constant which is selected when designing the system, taking into account such factors as the scale at which the map is displayed, positioning accuracy of the GPS receiver 1, and so on. The threshold value for this embodiment is 10 km.

According to the example shown in the temporary table 90 in FIG. 7, the fourth and the seventh images in terms of the image picking-up order have their respective linear distance from the previous site greater than 10 km. Therefore, the first through the third images are grouped in one, the fourth through sixth images are grouped in another, and the seventh through ninth images are grouped in still another.

Step S5: (Checking the Number of Images in Group)

The number of images in each group is checked. If a group has only one image therein, grouping is unnecessary, and therefore the process goes down to step S11, where a process for an independent image will be performed.

Step S6: (Selecting a Representative Image Picking-up Position: Group Name Determining Means)

If it is determined in step S5 that the group has a plurality of images therein, the controller 3 performs execution of the representative image picking-up position determining means 72, in which the controller 3 determines an image picking-up position of the first image in the group (image picking-up position data 623 of image data 624 which has the oldest date-and-time value in its image-taking data 622, in the image file 620) as the image picking-up position which represents those of the images in the group (representative image picking-up position). The representative image picking-up position, however is not necessarily be that of the first image in the group. For example, the representative image picking-up position may be that of the last image, that of the image in the middle of the list of images, that of the second image and so on.

Step S7: (Generating a Group Image Management Folder: Group Name Determining Means)

The controller 3 performs execution of the group image management folder generating means 73, in which the controller 3 compares the representative image picking-up position (given by latitude and longitude) selected in step S6 with the site position data 631 (latitude and longitude) stored in the site name file 630, and selects the site name 632 which is closest to the position (latitude and longitude) of the representative image picking-up position, from the site name file area 63, as a name of the group.

Step S8: (Generating a Group Image Management Folder: Storage Controlling Means)

The controller 3 generates a group image management folder 610, giving the folder the folder name selected in step S7 as the folder name 611, the representative image picking-up position (latitude and longitude) selected in step S6 as the representative image picking-up position 612, an address of the image file management data for the first image in the group as the subordinate file pointer 613.

Step S9: (Generating a Subordinate Image File Management Data: File Name Determining Means)

The controller 3 performs execution of the subordinate image file management data generating means 74, in which the controller 3 takes out an image picking-up position data (latitude and longitude) of an image in the group, from a corresponding image file 620, based on the image pointer. Then, the controller 3 compares the image picking-up position data with the site position data 631 (latitude and longitude) stored in the site name file 630, and selects a site name 632 which is closest to the image picking-up position (latitude and longitude), from the site name file area 63, as a name of the image. This file name selection cycle is performed for each of the images from the first to the last image in the group, and then the process goes to step S10.

Step S10: (Generating a Subordinate Image File Management Data: Storage Controlling Means)

The controller 3 sets an image pointer indicating a storage address of image data in the group as the image pointer 614, reads image picking-up position data (latitude and longitude) of this image from the corresponding image file based on the image pointer, sets the read position data as the image picking-up position data 615, and generates an image file management data with a storage address of the image file management data of a next image in the group as the subordinate file pointer 616 for the next image. This cycle of generation is performed for each of the images from the first to the last image in the group, and then the process goes to step S12. The last image file management data for the last image in each group has its subordinate file pointer 616 assigned with an ending mark (a unique symbol).

The image file names selected in step S9 are used as image file names for respective image files 620 contained in the group. However, the image file name may alternatively be included in each image file management data.

Step S11: (Generating an Independent Image File Management Data)

If it is determined in step S5 that the group has only one image, the controller 3 performs execution of the independent image file management data generating means 75, in which the controller 3 does not generate a group image management folder 610, but generates an image file management data, setting an image pointer indicating a storage address of this independent image data as the image pointer 614, and the image picking-up position (latitude and longitude) of this image taken out of the corresponding image file based on the image pointer as the image picking-up position data 615. The process then goes down to step S12.

Step S12: (Checking the End of Process)

The controller 3 checks if there is a next group to be processed. If there is, the process goes back to step S5, and if there is none, the process goes to step S13.

Step S13: (Registering the Generated Folders in the Management Folder Area)

The controller 3 registers (stores) in the flash memory 6 (the management folder area 61), the group management folders generated in step S8 and a plurality of subordinate image file management data generated in step S9. If there is any independent image file management data generated in step S11, this data is also registered (stored) in the flash memory 6.

According to step S4, the threshold value for setting the scope of group (i.e. the distance value between two image picking-up positions used for classifying each image to groups) is a constant which is fixed. However, it is not limited to this. For example, the threshold may be set based on distribution of the distance values between image picking-up positions.

Figure 9A:
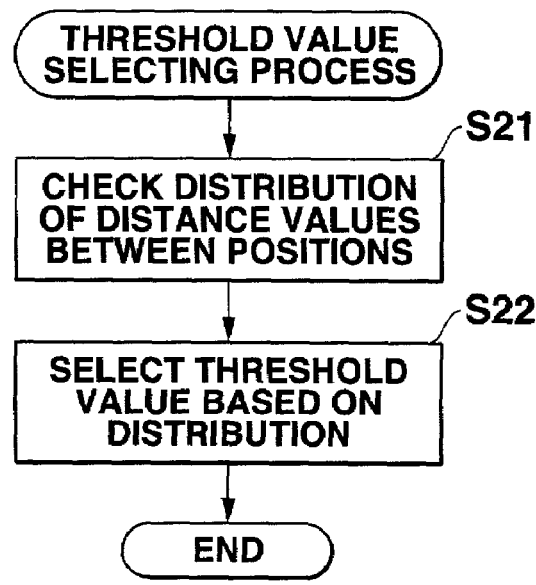
FIGS. 9A and 9B are flowcharts showing an operation example of a threshold value setting process and a process for selecting a representative image picking-up position in a group used in the grouping process.

Specifically, as shown in FIG. 9A, the controller 3 performs execution of the distance calculating means, and in step S21, checks distribution of the distance values between image picking-up positions listed in the distance column 94 of the temporary table 90 generated in step S2. The distribution check will give a distribution data about the distance from the previous position as follows: count six for the distance 0 km–10 km, count zero for the distance 10 km–50 km, count two for the distance 50 km–100 km, and count zero for the distance greater than 100 km.

The distance range with the greatest number of counts is the range 0 km–10 km. Therefore, step S22 selects the maximum value of the most frequent distance range, which is 10 km, as the threshold value.

According to step S6, a certain image in the group is used as the basis for selecting the representative image picking-up position. It is not limited to this, however. For example, a position represented by an average value of image picking-up positions of all the images in the group may be used as the representative image picking-up position.

Figure 9B:
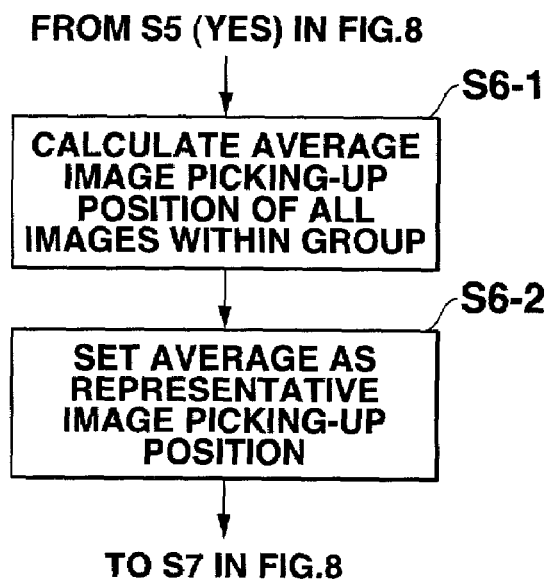

Specifically, as shown in FIG. 9B, if it is determined in step S5 of FIG. 8 that the group has a plurality of images, the controller 3 performs execution of the representative image picking-up position determining means 72, which includes step S6-1 of obtaining an average image picking-up position of all the images within the group, as an average image picking-up position.

In step S6-2, the average image picking-up position obtained in step S6-1 is selected as the image picking-up position that represents the group (representative image picking-up position), and then the process goes to step S7 of FIG. 8.

Figure 10A:
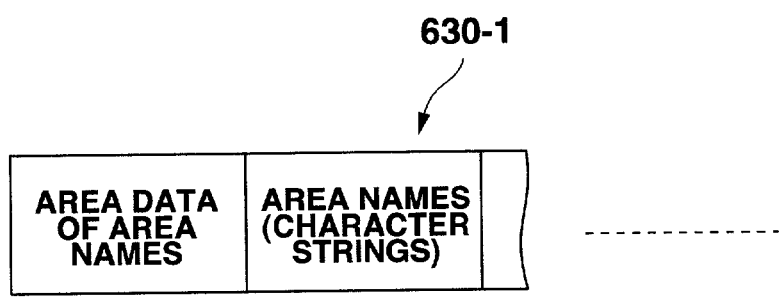
FIGS. 10A, 10B, and 10C are diagrams showing an area name file as another embodiment of the site name file.

According to the flowchart in FIG. 8, the group name is selected from the site name file 620 shown in FIG. 5. Alternatively, an area name file 630-1 shown in FIG. 10A may be used in place of the site name file 630.

Figure 11A:
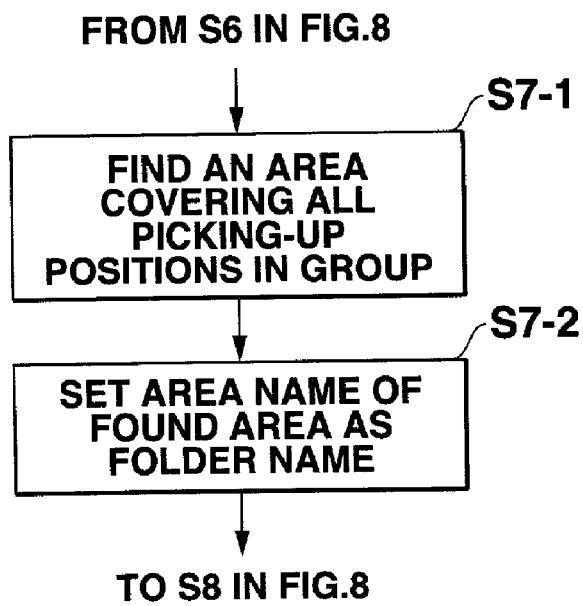
FIGS. 11A and 11B are flowcharts showing an operation example of a grouping process and group name determining process in a case where the area name file is used.

Specifically, as shown in FIG. 11A, after the representative image picking-up position has been selected in step S6 in FIG. 8, the process goes to step S7-1, where the image picking-up position data obtained in step S4 for each of the images in the group is compared with area data in the area name file 630-1, whereby an area data including all of the image picking-up positions for the images in the group is retrieved.

In step S7-2, the area name file 630-1 is searched for an area name (name data) associated with the area data retrieved, and the name found is selected as the folder name. The process then goes to step S8 in FIG. 8.

Figure 10B:
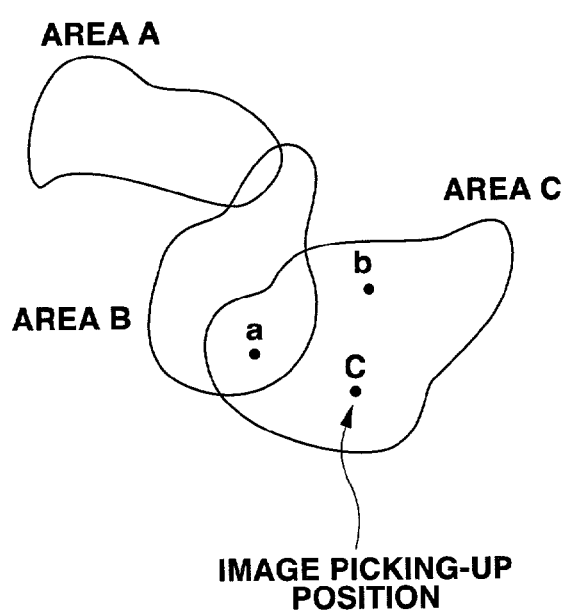

As shown in FIG. 10B for example, if the area name file 630-1 has the following area data: area "A", area "B" and area "C," the controller 3 finds that area "C" covers all the image picking-up positions "a" through "c" for the images in the group. Therefore, the area name file 630-1 is searched for an area name associated with area data of area "C," and the area name found is selected as the folder name.

According to the flowchart of FIG. 8, the images are grouped on the basis of the distance between image picking-up positions of each successive pair of images. Alternatively however, the grouping of the images may be performed by using the area name file 630-1 in FIG. 10A.

Figure 11B:
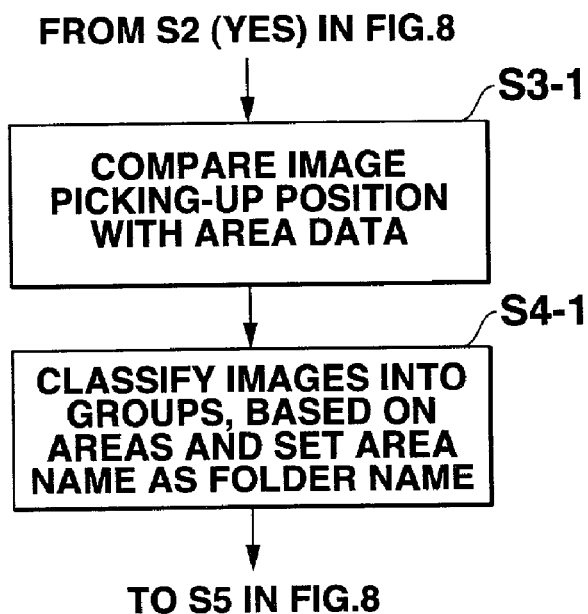

Specifically, as shown in FIG. 11B, after step S2 selects YES, the process goes to step S3-1, where image picking-up positions for each of the images are compared with the area data in the area name file 630-1.

In step S4-1, a group of image picking-up positions identified as being contained in the same area based on the comparison made in step S3-1 are selected, and images corresponding to these image picking-up positions are classified into one group. At the same time, the area name file 630-1 is searched for an area name (name data) associated with an area data representing this particular area, and the identified area name is selected as the folder name. The process then goes back to step S5 in FIG. 8. Step S3-1 and step S4-1 execute the grouping means and the group name determining means.

In this case, if the area data includes an area which overlaps with another area as shown in FIG. 10B, there can be a case where the controller 3 cannot select a single group. In order to avoid such a situation, it is preferable to use an area data in which areas do not overlap with another, as shown in FIG. 10C.

Figure 10C:
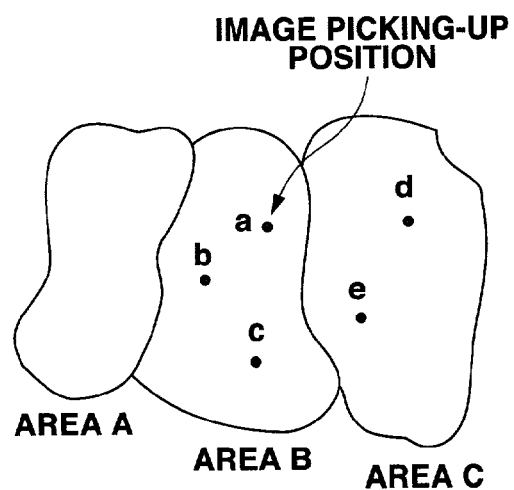

According to the example in FIG. 10C, images corresponding to the image picking-up positions "a" through "c" are grouped, and at the same time, the area name file 630-1 is searched for an area name associated with an area data representing the area "B," and this particular area name is selected as the folder name. Likewise, images corresponding to the positions "d" and "e" are grouped, and at the same time, the area name file 630-1 is searched for an area name associated with an area data representing the area "C," and this particular area name is selected as the folder name.

If the process shown in the flowchart in FIG. 11B is executed, step S7 in FIG. 8 is not necessary.

According to the flowchart shown in FIG. 8, the grouping process of the images and the group name determination process are performed after a number of images have been picked-up and therefore the flash memory 6 has a certain number of image files. However, the process may alternatively be performed every time the image is picked-up. In this case, the distance calculation is made for the distance between the current image picking-up position and the previous image picking-up position, and determination is made whether the current image should be classified into the group including the previous image or a new group which is to be generated. The folder name may be determined when the new group (folder) is generated. The execution of the grouping process can be triggered by a certain key operation, such as when the power is turned on or off. If an image is found to be an image to be classified into an existing group which includes an image found in step S1 in FIG. 8, a group image management folder 610 or an independent image file management data is not generated newly. Only a subordinate image file management data is generated which is subordinated to the existing group image management folder 610.

According to step S8 in FIG. 8, the folder name 611 of the group image management folder 610 is given a site name corresponding to the representative image picking-up position. It is not limited to this, however.

With the operation shown in the flowchart in FIG. 8, it is possible for a digital camera capable of storing image data with related image picking-up position data obtained through an image picking-up position data positioning means such as a GPS receiver to classify the image data into a group or groups based on the image picking-up position data and to make correspond a group name and a representative image picking-up position to the group.

According to the above embodiment, the digital camera 100 stores the management folders, image files, site name file and map data in the flash memory 6 (FIG. 2), and the grouping operation of the stored images and the group name selecting operation are performed. Alternatively however, the digital camera 100 may stores the management folders and image files in the flash memory 6 (i.e. the camera does not store the site name file and map data), and does not perform the folder name selection in step S7 and the group name storing operation in step S8 in FIG. 8. In other words, the group name is not associated with the group.

Figure 13:
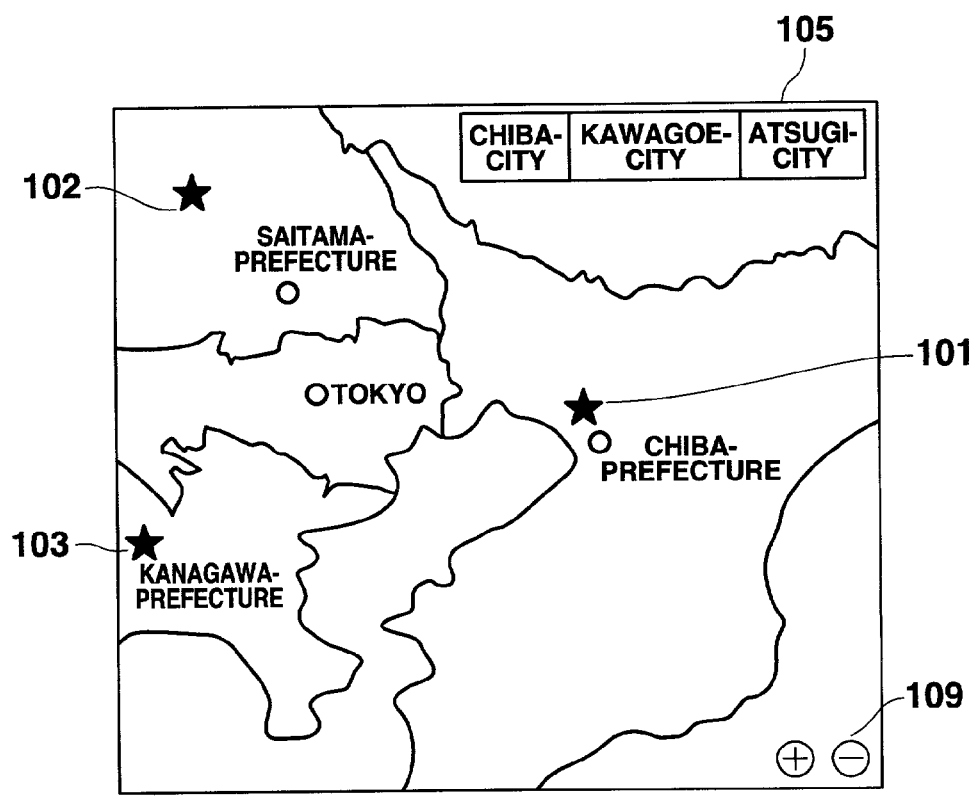
FIG. 13 is a diagram showing an embodiment of displaying a representative image picking-up position in a group and a group name on a map.

With the above alternative arrangement, there is no heavy burden on the memory since the digital camera does not store the map data and site name file. In other words, there is no need for limiting the number of images to be stored or for increasing the capacity of the flash memory. Further, if this arrangement is used, displaying operation of the group-representative image picking-up positions shown in FIG. 13 is not performed, and as will be described later, a picked-up image managing device such as a personal computer is used for selecting the group name, associating the group name with the grouped images, and displaying the group-representative image picking-up position.

Figure 12:
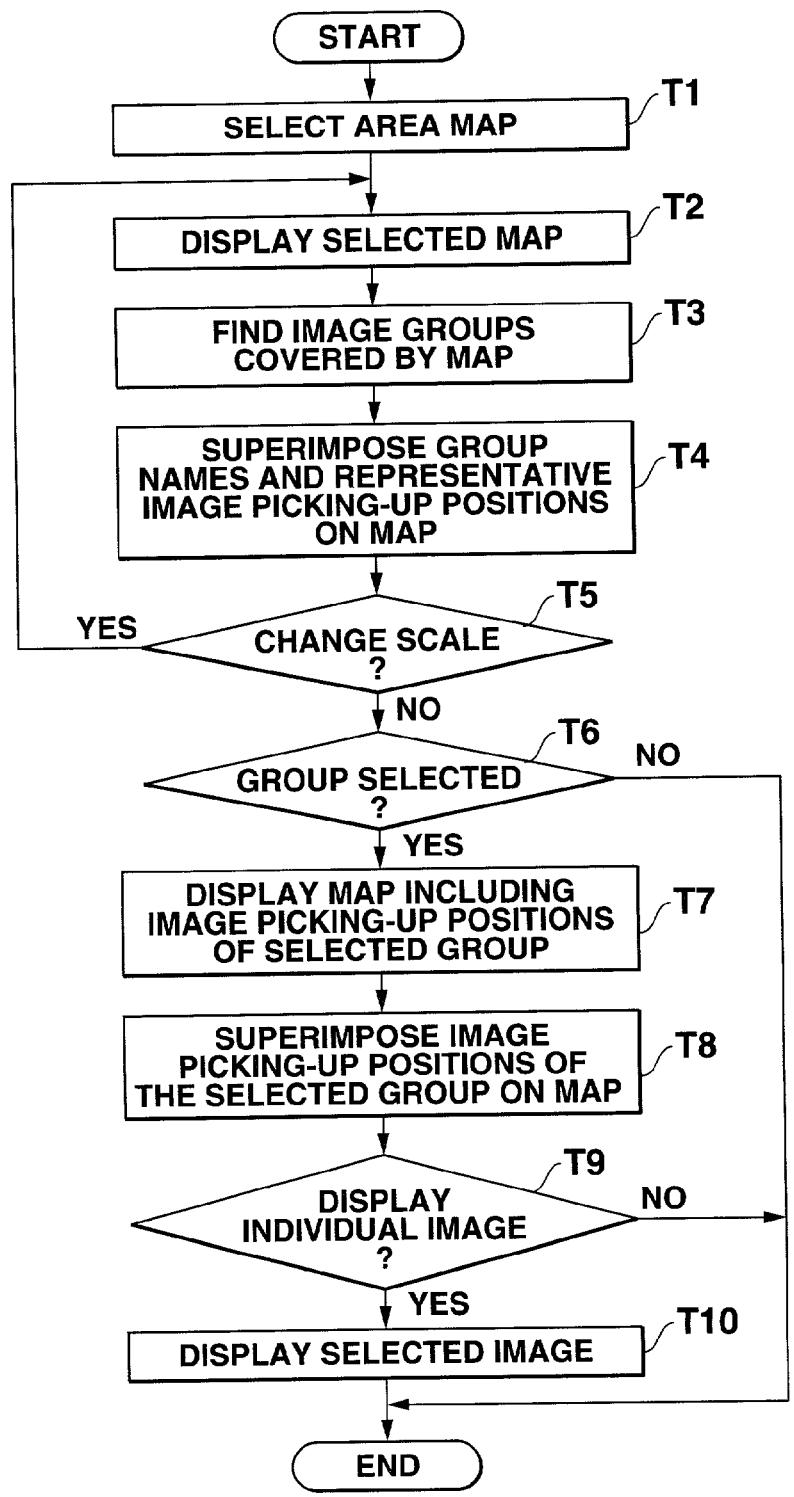
FIG. 12 is a flowchart showing an example of display operation of a group of images by the digital camera 100.
Figure 14A:
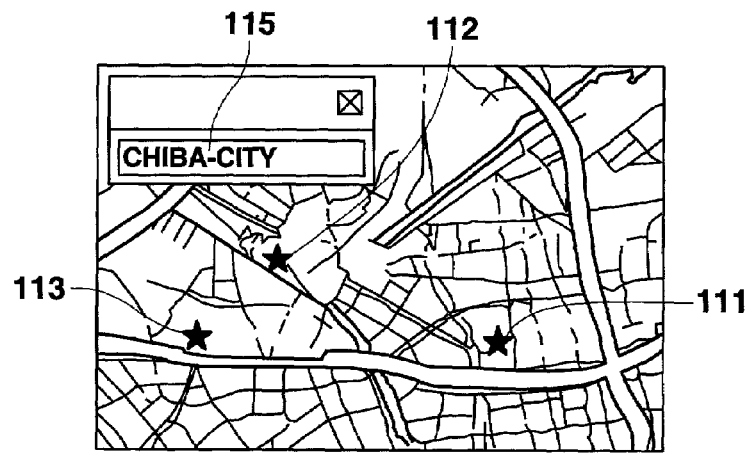
FIGS. 14A, 14B, and 14C are diagrams showing display examples of image picking-up positions and the group name, of picked-up images within a group (subordinate images) displayed upon selection of the group name on the map.
Figure 14B:
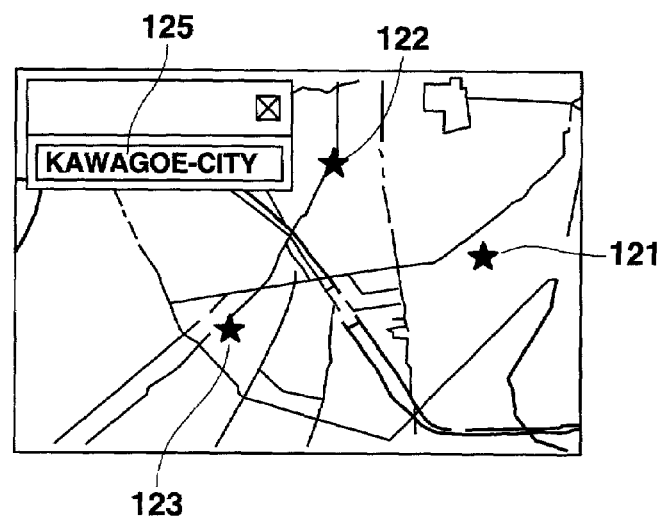
Figure 14C:
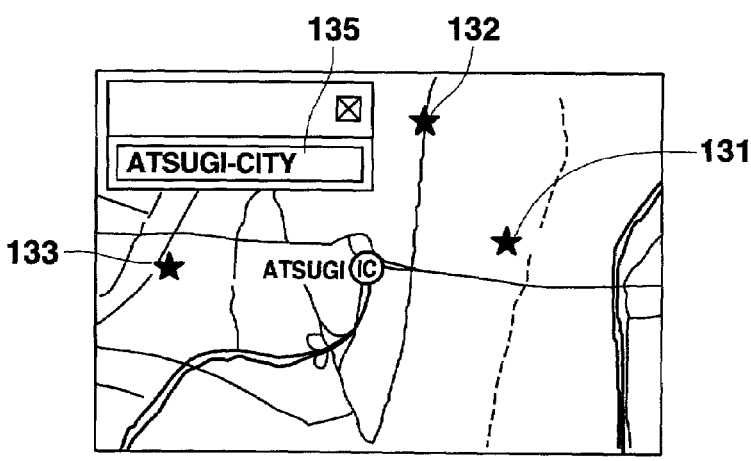

FIG. 12 is a flowchart showing an example of displaying operation of an image picking-up position on a map by the digital camera 100. FIG. 13 is a diagram showing an embodiment of the displaying operation of group-representative image picking-up positions on a map. FIGS. 14A–14C are diagrams showing example displays of image picking-up positions of picked-up images (subordinate images) in a selected group performed when the group name (or the representative image picking-up position) is selected on the map.

Step T1: (Selecting a Wide-area Map, etc.)

The controller 3 performs execution of the map display controlling means 81, by first displaying a predetermined map selection menu (not illustrated) which is a list of wide-area maps (such as KANTO region, TOHOKU region, etc.), and prompts the user to select. The scale of the map is set to a predetermined value that matches the screen size.

Step T2: (Displaying the Wide-area Map: Map Displaying Means)

When the user selects a map by operating the cursor key 44 in step T1, the process loads the map data of the selected map from the map data area 64 of the flash memory 6, and displays the map at the given scale after enlarging or reducing the size at the given scale.

Step T3: (Identifying the Picked-up Image Groups Included in the Map: Symbol Displaying Means)

A group image management folder 610 included in the displayed area of the map is identified based on the representative image picking-up position data 612.

Step T4: (Superimposing the Group Name and the Representative Image Picking-up Position: Group Name Displaying Means and Symbol Displaying Means)

The controller 3 performs execution of the group display controlling means 82, in which the representative image picking-up position data (latitude and longitude) 612 is obtained for each of the group image management folders 610 identified in step T3. Each position data is converted to screen coordinate values, and then the symbol ★ which indicates the representative image picking-up position is superimposed at each of the screen coordinate points, as shown in the example in FIG. 13. Further, the folder name 611 of each of the group image managing folders 610 are superimposed at a predetermined place 105 of the display screen. The folder name 611 may not be displayed at the predetermined place 105, but the folder name 611 may be displayed at the coordinate point of the representative image picking-up position, as the symbol.

Numeral 109 indicates scale change buttons. Every time the + (plus) button is selected by a pointing cursor for example, the map scale is reduced by a predetermined rate (zooming in the map, or the map is enlarged so the screen covers a smaller area.) Every time the – (minus) button is selected, the map scale is increased by a predetermined rate (zooming out the map, or the map is decreased so the screen covers a larger area.)

Step T5: (Checking for a Scale Change Command)

The process checks a signal from the user operating portion 4, to see if the user has operated the scale change button. If the scale change button has been selected and confirmed, the process increases or decreases the scale setting accordingly, and then goes back to step T2.

Step T6: (Checking for Group Selection: Symbol Selecting Means)

The controller 3 performs execution of the in-group image picking-up position display controlling means 83, in which the controller 3 checks the signal from the user operating portion 4, to see if the user has selected a group from those displayed in step T4, by pointing any one of the symbols 101–103, using the cursor key 44, or has selected a desired symbol (group) by pointing any one of the folder names (group names) 105. If the selection has been made, the process goes to step T7, and otherwise the process ends the displaying process.

Step T7: (Displaying a Map that Includes Image Picking-up Positions in a Selected Group: Map Display Controlling Means)

From the group image management folder 610 of the group selected in step T6, the process takes out the subordinate file pointer 613, and sequentially searches the chain of image file management data to fetch image picking-up position data (latitude and longitude) 615-1, 615-2, . . . (or the image picking-up position data 623 from the image file 620) for the images in the group. Map data of a map that covers these image picking-up positions is loaded from the flash memory 6, sent to the display device 7, and displayed. In order to allow easy recognition of each position in the group, the map scale is automatically adjusted so that all of the positions in the group are displayed in the screen in a smallest possible area covered by the screen.

Step T8: (Displaying the Image Picking-up Positions in the Selected Group, etc.: Symbol Display Controlling Means)

The group name (folder name) of the selected group is displayed at a predetermined place of the display screen. At the same time, the image picking-up position data (latitude and longitude) 615-1, 615-2, . . . fetched for each of the images in the group in step T7 are converted into screen coordinate values, and then the symbols ★ 111 through 113, 121 through 123, and 131 through 133, indicating respective image picking-up positions, are superimposed on the map, at respective screen coordinate points, with corresponding group names 115, 125 and 135, as shown in the examples in FIGS. 14A–14C.

Step T9: (Checking for Selection of an Individual Image)

The process checks the signal from the user operating portion 4, to see if the user has pointed any one of the symbols (image picking-up position) on the display, requesting that the image which is picked-up at this particular position should be displayed. If there is no such command for the image display, then the process ends the image display process. If there is, the process goes back to step T10.

Step T10: (Displaying an Individual Image)

The process takes out the image pointer 614 of the image file management data that stores the selected image picking-up position, and then loads the image data 624 from the image file 62 that corresponds to the pointer, decompresses and sends the data and to the display device 7, thereby displaying the image on the screen.

According to the operation shown in the flowchart in FIG. 12, only the group names of the grouped images and the representative image picking-up positions are displayed in a wide-area map. Therefore, unlike the conventional image picking-up position displaying method which displays symbols for all of the image picking-up positions, the symbols are not displayed so densely in an undesirably packed manner, and can be recognized easily. By selecting an individual group, individual image picking-up positions within the group can be displayed. Therefore, image picking-up positions within a group can be easy grasped.

According to the flowchart in FIG. 8, the scope-of-group setting means 71 generates a group identification table (step S2), calculates a distance from the previous image picking-up position (step S3), sequentially checks if the distance from the previous image picking-up position is greater than a threshold value, and creates a new group for a series of images starting from an image whose distance is greater than the threshold value, thereby setting the scope of the group (step S4), so that the grouping can be made automatically. It is not limited to this.

Figure 15A:
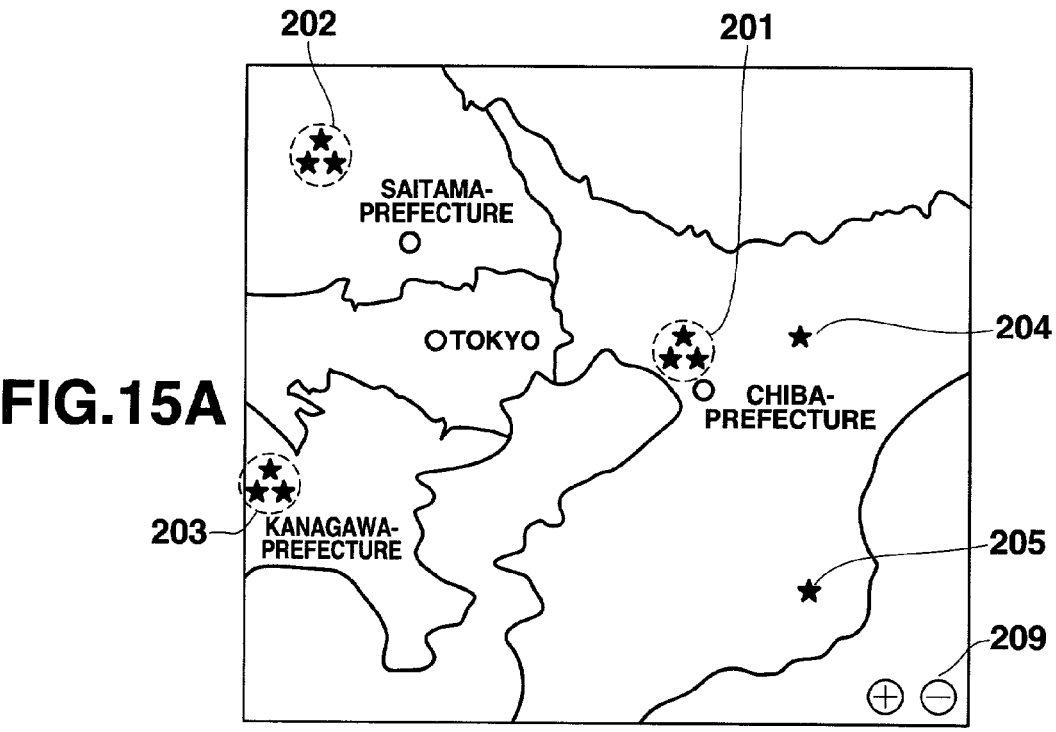
FIG. 15A is a diagram illustrating a scope-of-group specifying operation performed manually.
Figure 15B:
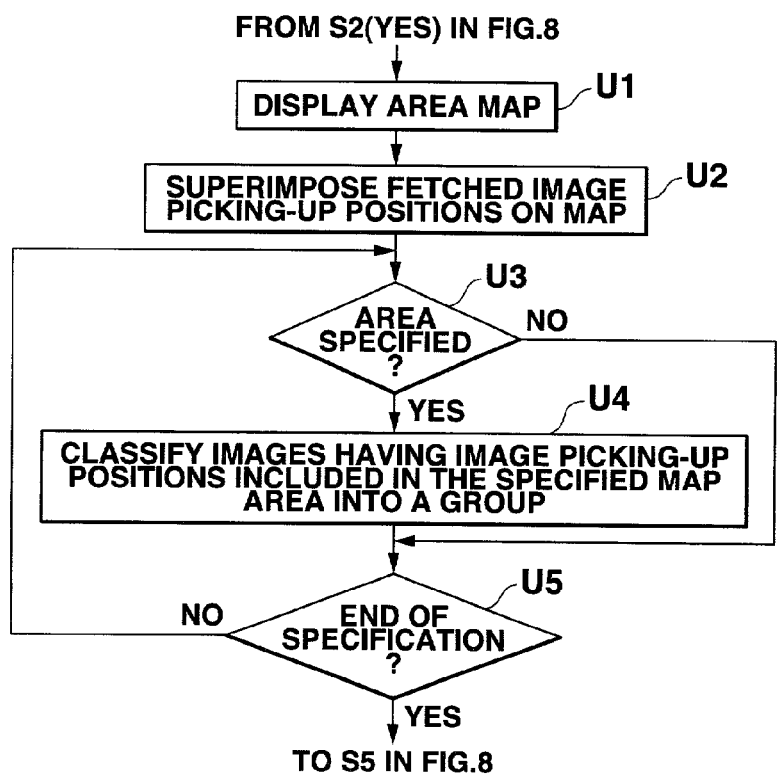
FIG. 15B is a flowchart showing an operation of the scope-of-group specifying process.

FIGS. 15A and 15B illustrate a manual operation for setting the scope of group.

As shown in FIG. 15A, a selected area map may display image picking-up positions included therein (only for the images which are not grouped yet), by using a symbol (the symbol ★ according to this example), so that the user may operate the cursor key 44 to specify scopes 201, 202 and 203, thereby setting the scopes of respective groups.

Specifically, as shown in FIG. 15B, if step S2 in FIG. 8 selects YES, then in step U1 (Map display controlling means) the process loads the area map data from the flash memory 6, send the data to the display device 7, and displays the map.

In step U2 (Symbol display controlling means), superimposition (of the symbol) is performed at each of the image picking-up positions identified in step S1, on the map as shown in FIG. 15A.

In step U3 (Picked-up image selecting means and Scope setting means), the user operates the cursor key 44 provided in the user controller 4, specifying a scope 201 for example. Then the process goes to step U4 (Grouping means), where images corresponding to the image picking-up positions included in the scope 201 are grouped.

In step U5, if the user operates the user controller 4 to end the scope setting mode, then the process goes back to step S5 in FIG. 8. Otherwise, the process goes back to step U5, and continues the process of the scope setting operation for the scopes 202 and 203.

The method of selecting the images for the grouping is not limited to the one illustrated with reference to FIGS. 15A and 15B. For example, the method may simply be such that the images are sequentially presented on the display device 7 so that selection can be made for those images to be grouped.

The description so far made for FIGS. 1–15B covers a case in which the picked-up image management is performed by a picked-up image managing device provided with image picking-up means such as a digital camera. However, the picked-up image managing device provided by the present invention is not limited to a digital camera. In other words, the present invention can be applied to a picked-up image managing device which is not provided with image picking-up means, such as a personal computer, a portable telephone, and portable data-communication terminal.

Figure 16A:
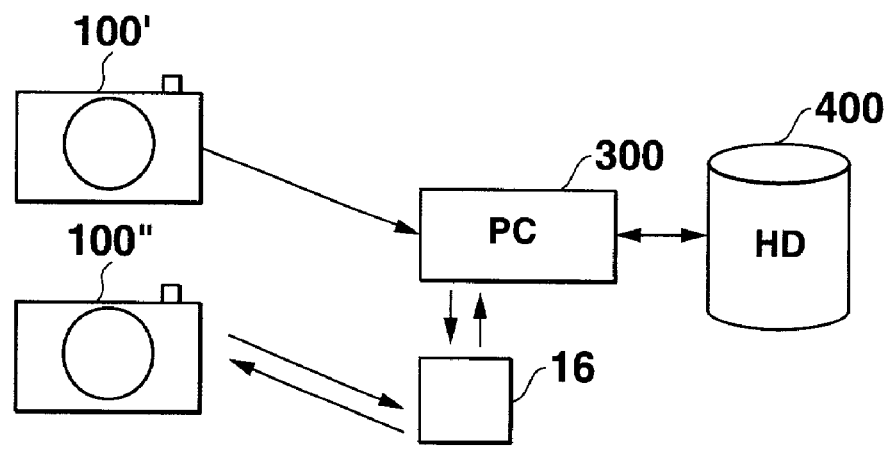
FIGS. 16A and 16B are diagrams showing a system configuration example, in a case where a personal computer is used as the picked-up image managing device.

FIG. 16A illustrates a case in which a personal computer serves as the picked-up image managing device.

In FIG. 16A, electronic cameras 100' and 100" are each provided with an image picking-up position acquiring means such as a GPS receiver, and stores picked-up images in relation with image picking-up position data (latitude and longitude) in its memory.

Figure 16B:
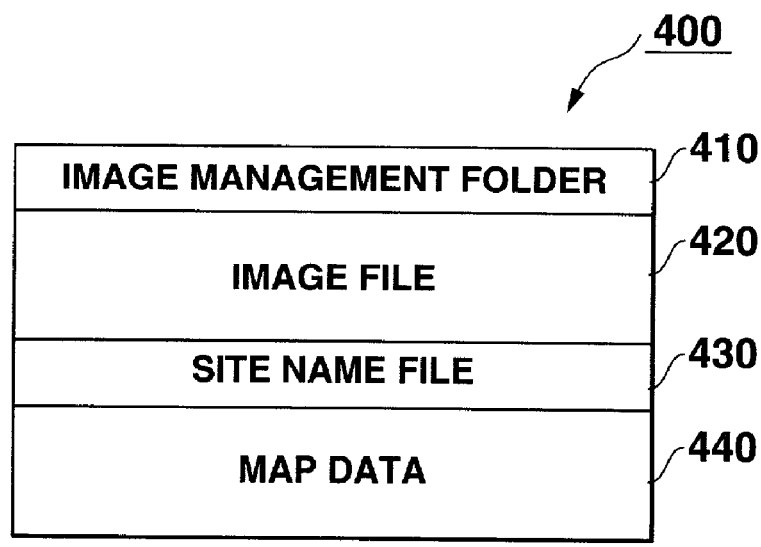

A personal computer 300 receives picked-up image data stored in the electronic cameras 100' and 100", and stores the data in such a storage memory as a hard disk 400. As shown in FIG. 16B, the storage memory 400 comprises a management folder area 410, image file area 420, site name file area 430, and map data area 440.

The management folder area 410, image file area 420, site name file area 430, and map data area 440 respectively have the same meanings as of the management folder area 61, image file area 62, site name file area 63, and map data area 64 in the flash memory 6.

There are also a group image management folder, image file management data, image file, site name file and map data, which respectively have the same structures as of the management folder 61, group management folder 610, image files 62-1 through 62-n, site name file 63 and map data 64.

As for a configuration of the picked-up image managing function, the personal computer 300 has a picked-up image classifying function essentially the same as the function of all of the means shown in the block diagram in FIG. 6A except for the function provided by the scope-of-group setting means. Likewise, the personal computer has the same group image displaying function as the function of all of the means shown in the block diagram in FIG. 6B. Operation by the user, such as selection of a map and setting a scope, is made via a mouse.

Method of inputting the picked-up image data to the personal computer may vary. For example, the electronic camera 100' transmits the image data via a wire communication link or a wireless communication link (including an infrared communication link) for reception by the personal computer. On the other hand, the electronic camera 100" has a removable storage memory (memory card) 16, which can be connected to the personal computer for unloading the data. As shown in the figure, the picked-up image data can be inputted from a plurality of electronic cameras.

Figure 17:
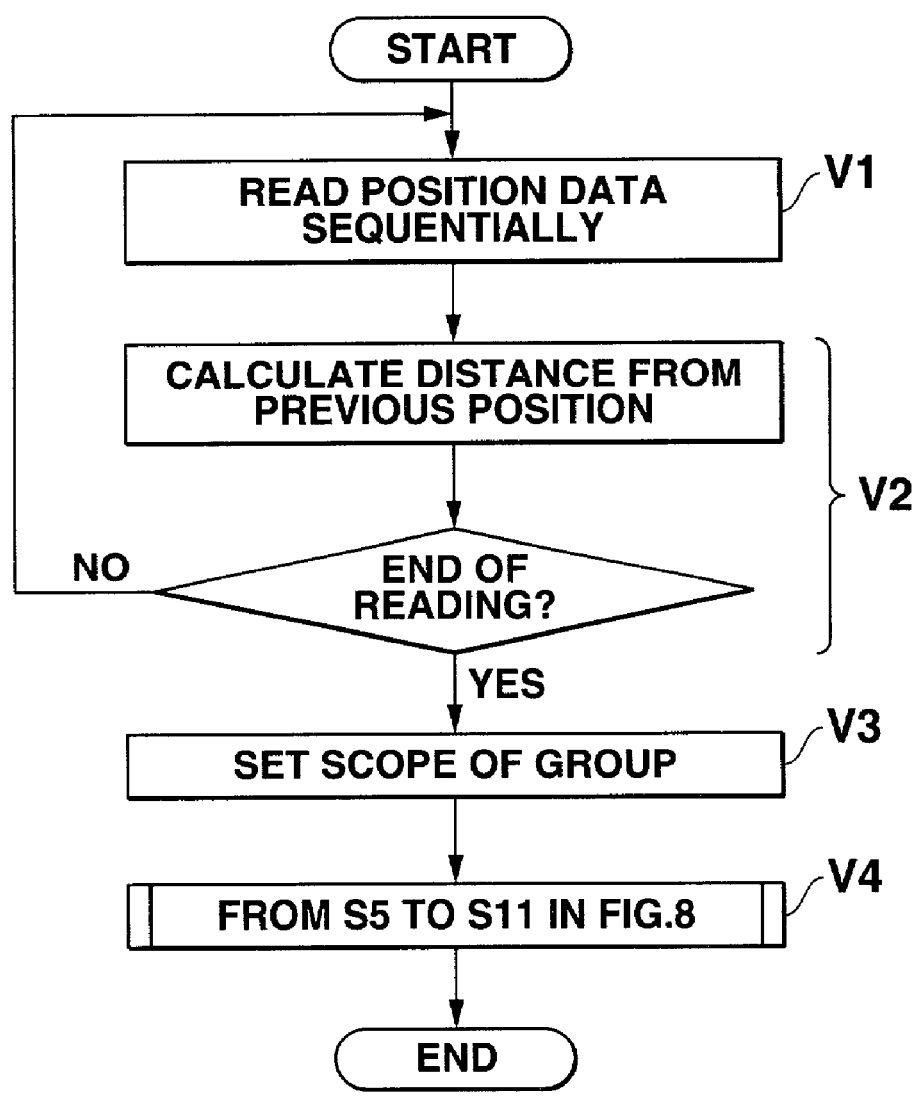
FIG. 17 is a flowchart showing an operation example of a grouping process of the images and a group name determining process by the personal computer.

FIG. 17 is a flowchart showing an example of image grouping operation by the personal computer 300. The personal computer 300 has the same group image displaying function as the group image displaying function shown in the flowchart in FIG. 12 performed by the digital camera 100.

Step V1: (Loading the Stored Images)

The controller 3 performs execution of the scope-of-group identification means 71' (FIG. 6A), by first loading from the hard disk 400, an image number (or storage address) and position data (latitude and longitude) of an image file 62 in the order of the stored images. If a picked-up image is linked with an image pointer 614 stored in an image file management data that follows a group image management folder 610, such an image data is treated as already grouped, and therefore not loaded.

Step V2: (Calculating a Distance Between Images)

Based on the image picking-up position data fetched in step V1, the distance is calculated for each of the picked-up image, and stored in relation with a corresponding pair of the image pointer and the image picking-up position data, and then the process goes back to V1. This cycle of operation is repeated until all of the picked-up images have been read. When all the images which are picked-up on a same day have been read, then the process goes to step V3.

Step V3: (Setting the Scope of Group: Grouping Means)

Images having a distance value within the threshold value are classified into the same group. These images classified into the same group have their respective image pointers and image picking-up positions held on the memory given a group number for group identification.

For example, according to the example shown in the temporary table 90 in FIG. 7, the fourth and the seventh images in terms of the image-taking order have their respective linear distance from the previous position which is greater than 10 km. Therefore, the first through the third images are grouped in one, the fourth through sixth images are grouped in another, and the seventh through ninth images are grouped in still another.

Step V4: (Checking the Number of Images in the Group—Storing the Generated Folders)

Hereinafter, operations performed in step V4 (Checking the number of images in the group—Storing the generated folders) are the same as performed in steps S5–S13 in the flowchart shown in FIG. 8.

According to the flowchart in FIG. 17, stored images taken by an image picking-up means such as a digital camera can be grouped, given a folder name, and managed by a picked-up image managing device such as a personal computer.

Image picking-up positions of the picked-up images can be indicated by symbols displayed on a map as shown in FIG. 15A, so that the user can specify a scope of group thereby setting a group boundary, and perform grouping operation, in the same way as in the case of the digital camera.

According to a picked-up image management device such as a personal computer, it is also possible to display a folder icon (including the folder name) on the display screen, so that the user can select the folder thereby getting image file names of the picked-up images stored therein displayed on the screen. Further, an image file management data in one group image managing folder can be moved to another group image managing folder. In other words, an image file in one group can be moved to another group (file copy). In the group image management folder from which the image is moved, remaining relevant file management data are respectively given new subordinate file pointers accordingly. Similarly, in the group image management folder to which the image is moved, relevant existing file management data are respectively given new subordinate file pointers accordingly.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, a digital camera which is not provided with map data and site name file can perform grouping of the picked-up images and creation of management files, but cannot associate the group name (folder name) with the group. Even with such a configuration, the picked-up image data and management files can be sent to the personal computer, and the relation with the group can be established on the personal computer, by fetching the site name from the site name file on the basis of the representative image picking-up position data (FIG. 3) stored in the group image management folder.

According to the above embodiment, the image picking-up position data provided as the latitude and longitude data are compared with a conversion table provided as the site name file or the area name file, thereby changed to site (area) name data, and this data is used as the group name. Alternatively, a pair of latitude and longitude data contained in the group may be used directly as the group name, or a pair of latitude and longitude data to be used as the group name may be obtained based on a plurality of latitude-longitude pairs which are associated with the picked-up image data.

The present invention is not limited to a mode of storage in which the picked-up image data is associated with the latitude-longitude data. For example, the present invention may be applied to a mode of storage in which an image picking-up site name data (file name) obtained based on the latitude-longitude data is associated with the picked-up image data, as the image picking-up position data.

An item of the image picking-up site name data (file name) associated with an item of the picked-up image data in the group may be selected directly as the group name, or an item of the site name data to be used as the group name may be obtained based on items of the image picking-up position data (file names) which are associated with items of the picked-up image data within the group.

According to the above embodiment, description covers a case in which the selected group name is used directly as the group name (folder name).

Alternatively, for example, additional data such as an image picking-up date and time and an image picking-up number may be added and this combined data may be used as the group name.

What is claimed is:

1. A picked-up image managing device comprising:
   picked-up image storing means for storing items of picked-up image data and items of image picking-up position data associated with the items of picked-up image data;
   name storing means for storing items of position data and items of name data associated with the items of position data;
   grouping means for classifying the items of picked-up image data stored in said picked-up image storing means into at least one group;
   identifying means for identifying one of the items of position data stored in said name storing means based on at least one of the items of image picking-up position data stored in association with the items of picked-up image data of the group; and
   group name determining means for setting a group name of the group as the item of name data stored in said name storing means in association with the identified item of position data.

2. The device according to claim 1, further comprising:
   image picking-up means for picking-up images of an object and outputting the items of picked-up image data; and
   image picking-up position acquiring means for acquiring image picking-up positions of the items of picked-up image data outputted from said image picking-up means and outputting the items of the image picking-up position data;
   wherein said picked-up image storing means stores the items of picked-up image data outputted from said image picking-up means and the items of image picking-up position data outputted from said image picking-up position acquiring means and associated with the items of picked-up image data.

3. The device according to claim 1, further comprising group name display controlling means for displaying the group name determined by said group name determining means on a display.

4. The device according to claim 1, further comprising storage controlling means for storing the group name determined by said group name determining means in said picked-up image storing means, in association with the items of picked-up image data of the group.

5. The device according to claim 4, wherein said storage controlling means comprises means for storing the group name in said picked-up image storing means as a folder name.

6. The device according to claim 1, wherein said items of position data stored in said name storing means comprise items of area data and the items of name data are associated with the items of area data.

7. The device according to claim 1, further comprising file name determining means for identifying one of the items of position data stored in said name storing means based on one of the items of image picking-up position data stored in said picked-up image storing means in association with one of the items of picked-up image data, and for setting a file name of said one of the items of picked-up image data as the item of name data stored in said name storing means in association with the identified item of position data.

8. The device according to claim 1, wherein:
said picked-up image storing means stores each said item of image picking-up position data and the associated item of picked-up image data in association with an item of image picking-up date-and-time data; and
said at least one of the items of image picking-up position data upon which the identification of said one of the items of position data stored in the name storing means is based comprises one of the items of image picking-up position data that is associated with an item of picked-up image data having an oldest image picking-up date-and-time value of all the items of picked-up image data of the group.

9. The device according to claim 1, wherein the identification of said one of the items of position data stored in the name storing means is based on a plurality of the items of image picking-up position data stored in said picked-up image storing means in association with the items of picked-up image data of the group.

10. The device according to claim 9, wherein said identifying means identifies the item of position data stored in said name storing means based on average image picking-up position data obtained by averaging the items of image picking-up position data stored in association with the items of picked-up image data of the group.

11. The device according to claim 1, wherein the items of position data stored in said name storing means are items of area data, and the items of name data are associated with the items of area data; and
wherein said grouping means classifies into one said group the items of picked-up image data stored in said picked-up image storing means in association with the items of image picking-up position data included in an area identified by one of the items of area data stored in said name storing means.

12. The device according to claim 11, wherein said identifying means identifies said one item of area data as said at least one item of position data.

13. The device according to claim 1, further comprising picked-up image selecting means for selecting arbitrary ones of the items of picked-up image data stored in said picked-up image storing means;
wherein said grouping means classifies the arbitrary items selected by said picked-up image selecting means into the group.

14. The device according to claim 13, further comprising:
map storing means for storing a map; and
map display controlling means for displaying the map stored in said map storing means on a display;
wherein said picked-up image selecting means comprises scope specifying means for manually specifying a desired scope on the displayed map; and
wherein said grouping means classifies into the group the items of picked-up image data stored in said picked-up image data storing means that are associated with the items of image picking-up position data included in the specified desired scope.

15. The device according to claim 14, further comprising symbol display controlling means for displaying a symbol indicating an image picking-up position at at least one place on the map identified by at least one of the items of said image picking-up position data stored in said picked-up image storing means.

16. The device according to claim 1, further comprising:
map storing means for storing a map;
map display controlling means for displaying the map stored in said map storing means on a display; and
symbol display controlling means for displaying a symbol at at least one place on the map determined based on at least one of the items of image picking-up position data stored in association with the items of picked-up image data of the group.

17. The device according to claim 16, wherein said symbol display controlling means comprises means for displaying on the map the group name determined by said group name determining means together with the symbol.

18. The device according to claim 16,
wherein said at least one place comprises a plurality of places on the map, and each of said places is determined based on at least one of the items of image picking-up position data stored in association with the items of picked-up image data of the group; and
wherein the device further comprises:
symbol selecting means for selecting one of the symbols displayed on the map; and
second symbol display controlling means for displaying symbols at places on the map identified by the items of image picking-up position data stored in association with the items of picked-up image data included in a group corresponding to the symbol selected by said symbol selecting means.

19. The device according to claim 1, further comprising:
map storing means for storing a map;
map display controlling means for displaying the map stored in the map storing means on a display; and
symbol display controlling means for displaying symbols at places on the map identified by the items of image picking-up position data stored in association with the items of picked-up image data of the group.

20. The device according to claim 19, wherein said symbol display controlling means comprises means for displaying on the map the group name determined by said group name determining means together with the symbols.

21. A picked-up image managing device comprising:
picked-up image storing means for storing items of picked-up image data and items of image picking-up position data associated with the items of picked-up image data;
grouping means for classifying the items of picked-up image data stored in said picked-up image storing means into at least one group; and
group name determining means for determining a group name of the group based on at least one item of the items of image picking-up position data stored in said picked-up image storing means and associated with the items of picked-up image data of the group;
wherein said grouping means classifies the items of picked-up image data based on whether or not a distance between each pair of items of image picking-up position data stored in said picked-up image storing means is greater than a predetermined value.

22. The device according to claim 21, further comprising distance setting means for setting the predetermined value based on a distribution pattern of the distance between each said pair of items of image picking-up position data.

23. A method of managing picked-up images, comprising:
outputting an item of picked-up image data upon imaging an object;
acquiring an item of image picking-up position data of the output item of picked-up image data;
storing the output item of picked-up image data and the acquired item of image picking-up position data in association with each other in a storage section;
classifying a plurality of said items of picked-up image data stored in the storage section into at least one group; and
identifying, from a plurality of items of position data stored in association with items of name data, one of the items of position data based on at least one of the items of image picking-up position data stored in associated with the items of picked-up image data of the group; and
setting a group name of the group as the item of name data stored in association with the identified item of position data.

* * * * *